United States Patent [19]
Jensen

[11] 3,863,514
[45] Feb. 4, 1975

[54] BELT-DRIVE TRANSMISSIONS OF AMPLIFIED LOW/HIGH RATIO RANGE FOR SELF-PROPELLED SURFACE VEHICLES

[75] Inventor: Stanley W. Jensen, Omaha, Nebr.
[73] Assignee: Beatrice Foods Co., Chicago, Ill.
[22] Filed: Jan. 15, 1973
[21] Appl. No.: 323,901

[52] U.S. Cl. .................. 74/230.17 A, 74/230.17 D
[51] Int. Cl. ........................................... F16h 55/52
[58] Field of Search ............ 74/230.12 A, 230.17 E, 74/230.17 R, 230.17 D

[56] References Cited
UNITED STATES PATENTS

| | | | |
|---|---|---|---|
| 2,251,488 | 8/1941 | Hucke | 74/230.17 D |
| 2,378,549 | 6/1945 | Gruenhagen | 74/230.17 E |
| 2,623,400 | 12/1952 | Davis | 74/230.17 E |
| 2,695,529 | 11/1954 | Evans | 74/230.17 D |
| 3,152,490 | 10/1964 | Lemieux | 74/230.17 A |
| 3,263,763 | 8/1966 | Adams | 74/230.17 B |
| 3,364,766 | 1/1968 | Ramo | 74/230.17 D |
| 3,625,079 | 12/1971 | Hoff | 74/230.17 E |

FOREIGN PATENTS OR APPLICATIONS

| | | | |
|---|---|---|---|
| 453,124 | 11/1949 | Italy | 74/230.17 D |
| 106,440 | 5/1917 | Great Britain | 74/230.17 D |

Primary Examiner—Charles J. Myhre
Assistant Examiner—R. H. Lazarus
Attorney, Agent, or Firm—George R. Nimmer

[57] ABSTRACT

Variable-Ratio belt-drive transmission of conventional tri-partite construction (herein referred to as "TVRBD") have long been employed as the power transmission means from the variable "rpm" engine-shaft to the tires or other underlying moving traction means of comparatively heavily-loaded low-horsepower self-propelled surface vehicles such as mini-bikes, golf carts, snowmobiles, etc. The "TVRBD" three main parts include a single endless annular V-belt engaged with and extending directly between a pair of variable-width pulleys located a fixed distance apart including a driver-pulley and a driven-pulley. The two flanges for each variable-width pulley diverge away from the pulley transverse axis at some judiciously selected angle (usually about 26°) whereby typical "low" and "high" gear ratios of 3.2:1 and 1:1, respectively, are practical; thus, an overall "low/high" ratio range of about 3.2/1 is considered "standard". However, with the interposition herein of a ratio amplifying means comprising a further V-belt and a uni-axial twinned-pulley having interdependent pitches (for the two V-belts), and at the functional juncture of the V-belt and driven-pulley components of "TVRED". the "low/high" ratio range of the resultant transmission is amplified to at least 7/1, or to even 9/1.

5 Claims, 7 Drawing Figures

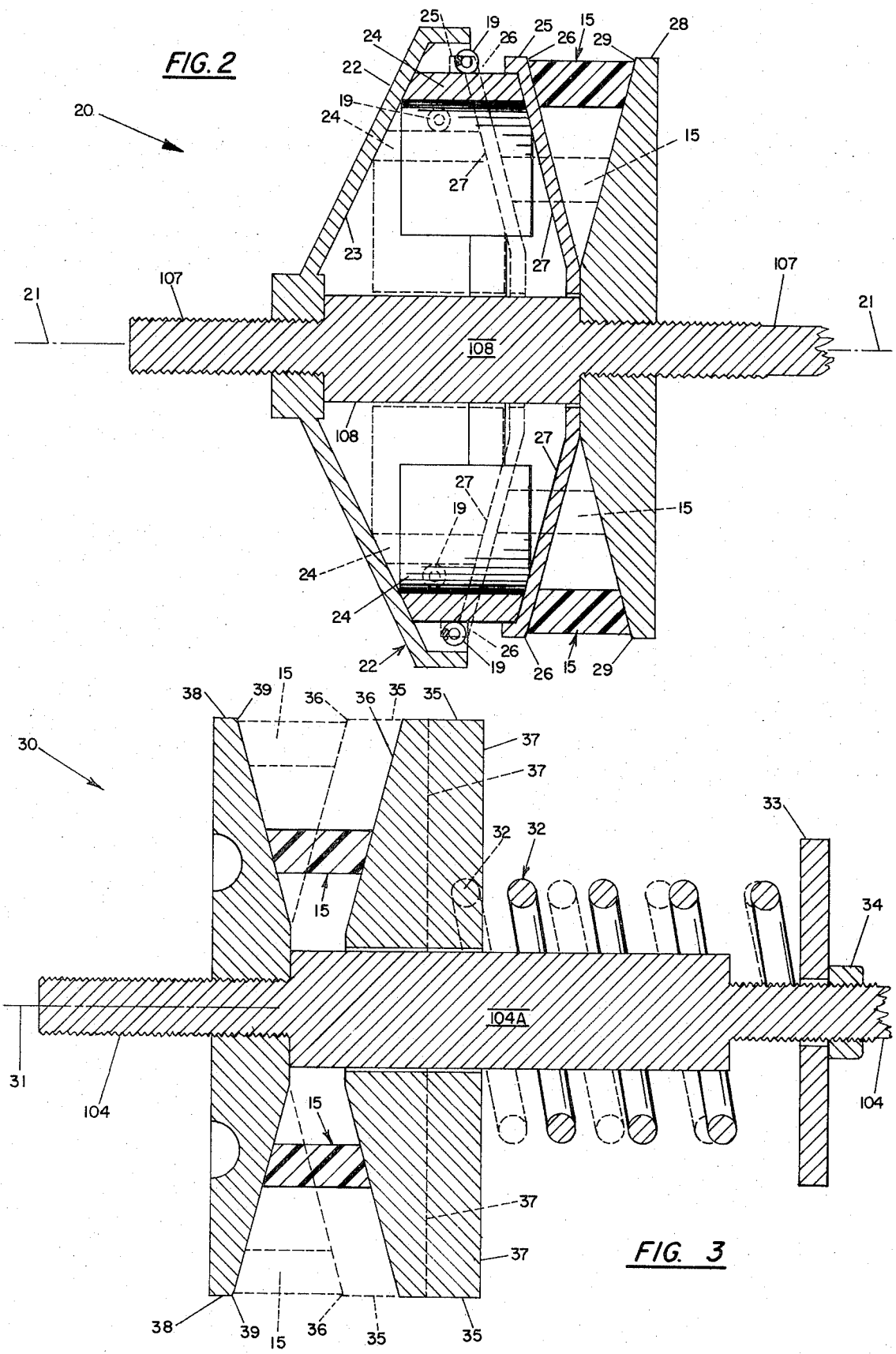

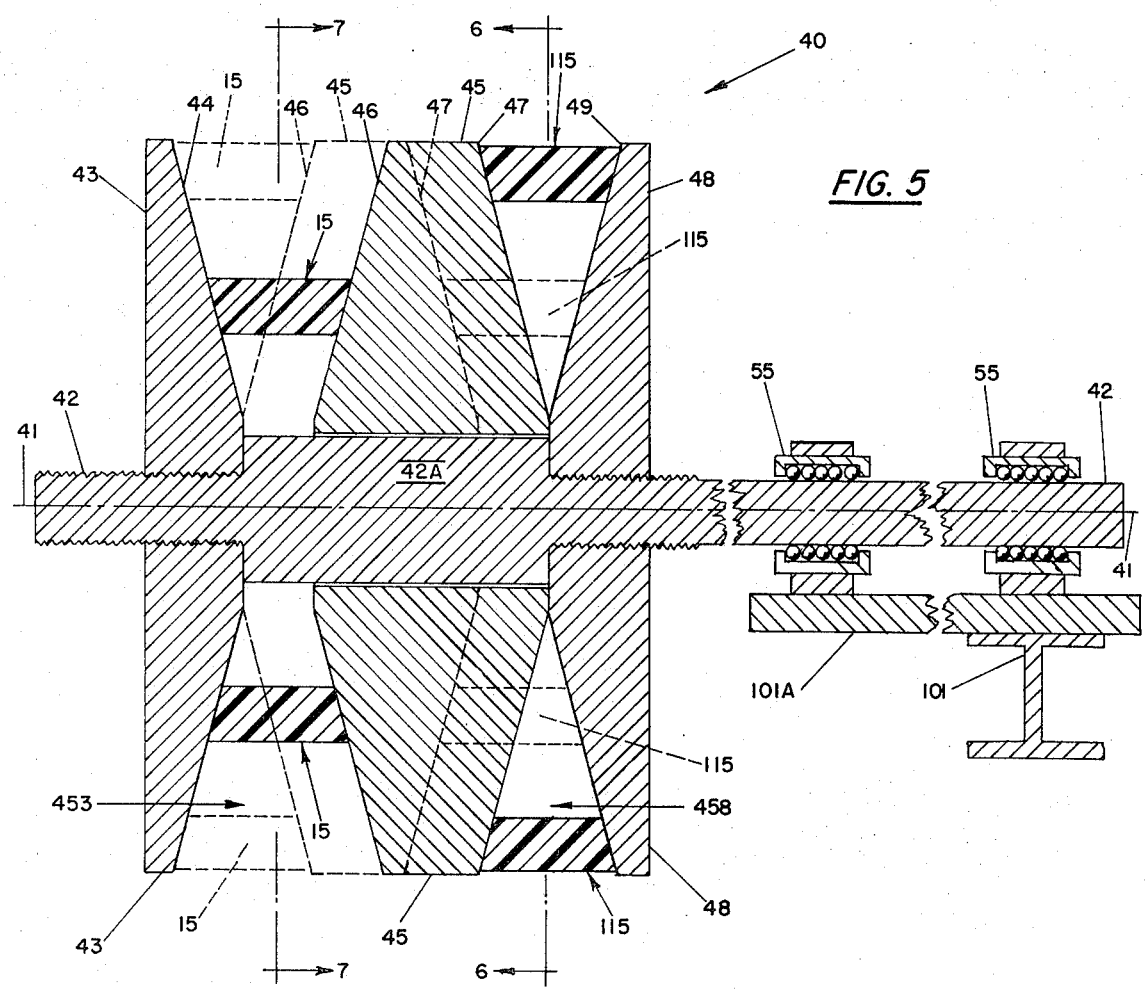
FIG. 5
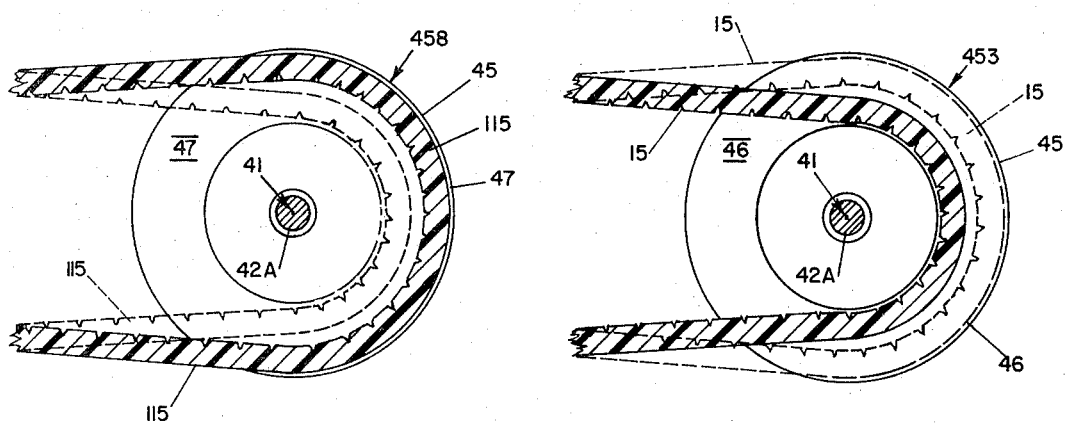
FIG. 6
FIG. 7

BELT-DRIVE TRANSMISSIONS OF AMPLIFIED LOW/HIGH RATIO RANGE FOR SELF-PROPELLED SURFACE VEHICLES

For many years variable-ratio belt-drives have been employed as the power transmission means between the variable speed engine and the tires or other movable underlying traction means of self-propelled surface vehicles. Variable-ratio belt-drive power transmissions are especially suited and efficient for comparatively heavily-loaded self-propelled surface vehicles such as minibikes, riding lawnmowers, golf carts, snowmobiles, etc., wherein the variable speed engine, such as a variable "rpm" gasoline engine, is of relatively low horsepower as compared to the loaded vehicle to be propelled therewith. As alluded to in the prior U.S. Pat. Nos. 2,623,400 (Davis), 2,678,566 (Oehrli), and 2,928,286 (Davis), variable-ratio belt-drive transmissions are basically of tri-partite construction (sometimes herein referred to as "TVRBD") including a single endless annular V-belt engaged with and extending directly between a pair of variable-width pulleys. The transversely extending axes of the respective pulleys are maintained in substantial parallelism and at fixed constant inter-axial distance by the framework or chassis of the self-propelled vehicle. There is a driver-pulley (made directly co-revolvable with the engine-shaft) wherein the two pulley flanges are of variable-width spacing along its transverse axis, and there is a driven-pulley (functionally the nearer to the vehicle traction means) wherein the two pulley flanges are of variable-width spacing along its axis. For each of the two variable-width pulleys, the two opposing faces (usually frustro-conical) of the two flanges are non-parallel and diverge from the pulley axis to accommodate the V-belt therebetween and at some radius from the pulley axis depending upon the transverse distance between the two intra-pulley flanges.

The transverse distance between the two flanges of the driver-pulley is at least partially dependent upon the vehicle's engine speed ("rpm"), it being important that the transverse distance decrease automatically with increasing engine "rpm". This desired result can be accomplished in several ways, as for example providing one or both of the driver-pulley flanges with centrifugal force sensing means, such as a movable weight adapted to move both away from and transversely along the driver-axis with increasing engine-shaft "rpm". Thus, at increasing engine "rpm", the V-belt pitch diameter on the driver-pulley tends to progressively increase. For this reason, driver-pulleys are sometimes generically classified as "normally-closed speed-responsive". On the other hand, driven-pulleys are usually generically classified as "normally-open torque-responsive" because there are springs, air hoses, or other yieldable biasing means tending to automatically urge the two pulley flanges thereof transversely toward each other. Thus, because the distance between the driver-axis and the driven-axis remains constant, and considering the substantially fixed annular size V-belt is forced progressively radially away from the driver-axis at increasing engine "rpm", there is necessarily a progressive radial movement of the V-belt toward the driven-axis. This phenomenon of the V-belt moving in opposite radial directions from the constantly spaced axes of the two variable-width (i.e. variable-pitch) pulleys does provide the basic principle for such tri-partite variable-ratio belt-drives ("TVRBD") and in response to the vehicle operator's control of engine "rpm". Admittedly, however, various refinements of this basic principle for "TVRBD" have been made over the recent years.

It has long been recognized that the range of drive ratios provided by these tri-partite variable-ratio belt-drives ("TVRBD") is proportional to the included angle between the opposing faces of the respective variable-width (variable-pitch) pulleys, which bear against the similarly angled V-belt. Generally speaking, the smaller this included angle, the greater is the overall range of speed ratios between the driver-pulley and the driven-pulley. However, as the intra-pulley included facial angle is reduced, also reduced is the maximum driving load which can be propelled by the engine. Faced with these parameters, "TVRBD" prior art workers have long concluded (based upon experimentation) that the "optimum" angle between intra-pulley faces is approximately 26°. Under such "optimum" face angle conditions for each variable-width pulley, the "low" gear drive ratio is about 3.2:1 while the "high" gear drive ratio is about 1:1. These typical "low" and "high" drive ratios provide an overall "low/high" ratio range "standardized" at about 3.2/1. However, there are situations, such as for heavily loaded vehicle carts, when it is desireable to have a "superlow" drive ratio considerably above 3.2:1, such as 6:1, or even higher. However, as already noted, to attain such "super low" ratios on conventional tri-partite "TVRBD" would have to entail reducing the face angle to below 26° which would require a larger horsepower engine to maintain vehicle maximum speed ("mph") capability under "high" drive conditions. Said in another way, under the "optimum" 26° face angle the overall "low/high" ratio range remains substantially at 3.2/1, and this is true irrespective of the value chosen for the "low" gear drive ratio.

It is accordingly the general object of the present invention to provide a variable-ratio belt-drive type transmission having a "low/high" ratio range amplified from the 3.2/1 ratio value heretofore considered "standard" for "TVRBD" to a much higher "low/high" ratio such as 7/1 or even 9/1. It is an ancillary general object to attain this numerically amplified "low/high" ratio range while continuing to utilize a relatively low horsepower engine to attain high vehicle speeds ("mph"), ergo a low horsepower engine to carry heavy loads.

It is another general object to provide variable-ratio belt-drive transmissions which can be based upon various types of prior art tri-partite structures ("TVRBD") and readily adapted to numerous kinds of comparatively heavily-loaded low-horsepower self-propelled surface vehicles having an engine of controllably variable engine-shaft speed ("rpm").

With the above and other objects and advantages in view, which will become more apparent as this description proceeds, the variable-ratio belt-drive transmissions of amplified low/high ratio range generally comprise, and based upon some selectable "TVRBD," the interpositional addition of a further V-belt and a uniaxial twinned-pulley inherently providing interdependent pitches (for the two V-belts) and at the functional juncture of the V-belt and driven-pulley components of the selected "TVRBD," whereby the low/high ratio range for the resultant penta-partite belt-drive transmission is amplified to at least 7/1, or even higher.

In the drawing, wherein like characters refer to like parts in the several views, and in which:

FIG. 2 is a sectional elevational view taken along lines 2—2 of FIGS. 1 and 4, thus indicating that a same type driver-pulley can be used in both the prior art ("TVRBD"— FIG. 1) and in the "ARVRBD" concept of this invention (FIG. 4). Phantom lines again indicate the engine-shaft and driver-pulley at low "rpm," and solid lines indicate a high "rpm" condition.

FIG. 3 is a sectional elevational view taken along lines 3—3 of FIGS. 1 and 4, thus indicating that a driven-pulley might be selected from a prior art "TVRBD" environment (FIG. 1) and utilized in the "ARVRBD" concepts of this invention (FIG. 4).

FIG. 5 is a sectional plan view taken along line 5—5 of FIG. 4, solid lines indicating engine-shaft and driver-pulley high "rpm," and phantom lines indicating driver-pulley low "rpm."

FIG. 6 is a sectional elevation view taken along lines 6—6 of FIGS. 4 and 5.

FIG. 7 is a sectional elevational view taken along lines 7—7 of FIGS. 4 and 5.

Figure 1:
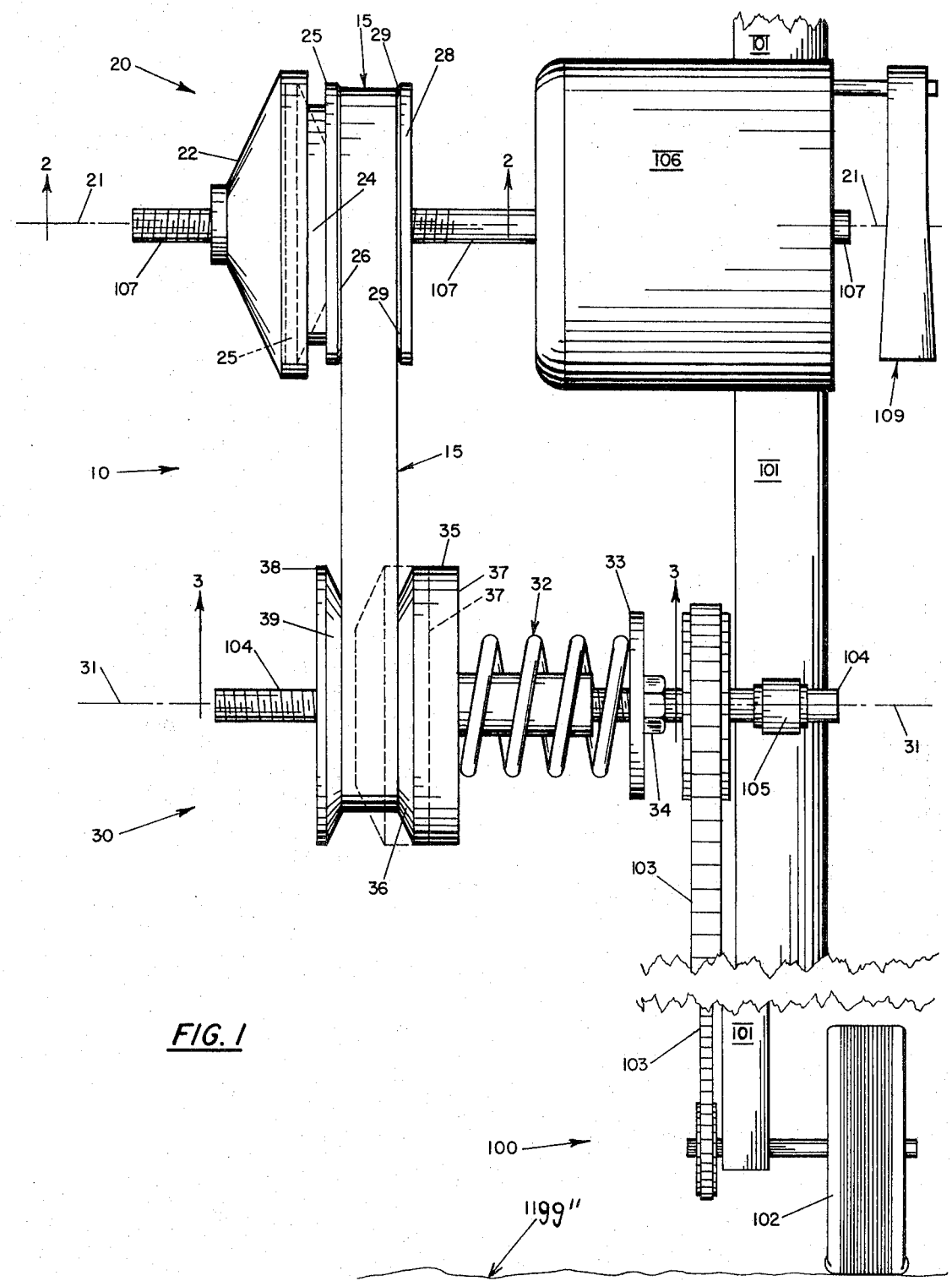
FIG. 1 is a schematic plan view of a typical self-propelled surface vehicle environment having a rudimentary tri-partite variable-ratio belt-drive transmission ("TVRBD") of the prior art. Phantom lines indicate the engine-shaft, driver-pulley, and driven-pulley at low angular velocity "rpm," while solid lines indicate these elements at higher "rpm."

Referring initially to FIG. 1 of the drawing which shows in schematic plan view a typical overland vehicle environment having a rudimentary form tri-partite variable-ratio belt-drive transmission 10 ("TVRBD") of the prior art. In the selected typical embodiment, the minibike self-propelled overland vehicle 100 comprises a frame 101 having a rear drive wheel (e.g. tire 102) as the underlying traction means for the earth's surface "99." Tire 102 is herein driven by a chain 103 from a jack-shaft 104 rotatably secured in a bearing 105 mounted on frame 101. An engine 106 (also mounted to vehicle frame 101) has a driver-pulley 20 co-rotatably mounted on engine-shaft 107 and connected by endless annular V-belt 15 to driven-pulley 30 that is co-rotatably attached to jack-shaft 104. Engine 106 is of some conventional variable speed (i.e. variable "rpm") type, such as a gasoline engine having some operator controlled throttle 109, whereby the throttle controls the engine-shaft 107 "rpm." As has been alluded to, the tri-partite variable-ratio belt-drive transmission 10, from the vehicle engine to the traction means (e.g., engine-shaft 107 to jack-shaft 104), generally comprises a single endless annular V-belt 15 engaged with and extending directly between a pair of variable-width pulleys located a fixed distance apart including a "speed-responsive" driver-pulley 20 and a "torque-responsive" driven-pulley 30. The fixed distance between the parallel transverse axes 21 and 31 for the respective variable-width pulleys 20 and 30 is herein maintained through the parallel relationship of engine-shaft 107 and jack-shaft 104 established by the vehicle rigid frame 101. In the ensuing paragraphs and in FIGS. 1–3, solid line indicates the driver-pulley 20, the V-belt 15, and driven-pulley 30 at higher "rpm"speed for engine-shaft 107, while phantom line indicates these same three primary elements of "TVRBD" (10) at lower "rpm" for engine-shaft 107. The driver-pulley 20 and the driven-pulley 30 selected herein are of very rudimentary form, it being understood that the inventive concepts claimed herein are likewise adapted for more sophisticated kinds of driver-pulleys and driven-pulleys.

The variable-width driver-pulley 20, having its transverse central axis 21 as the axis of engine-shaft 107, comprises two flanges including a stationary flange 28 and a movable flange 25 which is movable in the transverse direction, i.e., parallel to axis 21. The transverse immobility for stationary flange 28 is herein provided through its threaded engagement with engine-shaft 107 and tightly against the engine-shaft enlarged shouldered portion 108. The transverse movement for movable flange 25 is herein provided through its surrounding and transversely slidable or shiftable relationship with engine-shaft enelarged shouldered portion 108. It can be seen in FIG. 2 that the opposing faces 26 and 29 for the respective flanges 25 and 28 are non-parallel and diverge away from the pulley axis 21 to accommodate the V-belt 15 therebetween, the cross-sectional angle (FIG. 2) provided by faces 26 and 29 being constant (such as about 26°) irrespective of the transverse distance between the two flanges.

The transverse distance between the two driver-pulley flanges is at least partially dependent upon the vehicle's engine speed (i.e. "rpm" of engine-shaft 107), it being important that the flanges' transverse spacing decrease automatically with increasing "rpm" for the engine-shaft. Although this desired result can be accomplished in several ways, the traditional manner has been to utilize centrifugal force sensing means for transversely moving a pulley flange. For example, in the FIG. 2 rudimentary form, driver-pulley 20 utilizes two heavy weights, each weight being radially movable away from the pulley axis 21 and also moving transversely rightwardly against the movable flange 25 with increasing "rpm" for engine-shaft 107. The respective movable weights 24 are each of substantial half-ring form which are resiliently urged toward axis 21 by one or more garter springs 19 each completely surrounding the separate sectoral weights 24 and also axis 21. As seen cross-sectionally in FIG. 2, each half-ring weight 24 is of substantial trapezoidal shape, and the concave inner surface 27 of movable flange 25 is generally parallel its frustro-conical face 26. There is a driver-pulley drum portion 22 that is immovable along axis 21, as by threadedly engaging drum 22 with engine-shaft 107 and tightly against shouldered portion 108. The concave inner surface 23 of drum 22 and movable pulley inner contour 27 are cross-sectionally non-parallel and converge remote from pulley axis 21. Thus, if the engine-shaft speed, commencing at low "rpm" (phantom line-FIG. 2), is increased, centrifugal force causes the respective weights 24 to move radially outwardly of axis 21 and against the inside contour 27 of flange 25 whereby it is moved transversely rightwardly (solid line — FIG. 2). As this happens, V-belt 15 has a greater pitch diameter on driver-pulley 20, i.e., V-belt 15 is forced radially away from axis 21 and belt speed likewise increases.

The other variable-width pulley, driven-pulley 30, having its transverse central axis 31 as the axis of jack-shaft 104, comprises two flanges including a stationary flange 38 and a transversely movable flange 35. Transverse immobility for stationary-flange 38 is herein provided through its threaded engagement with jack-shaft 104 and tightly against the jack-shaft enlarged shoulder portion 104A. The transverse movement for movable flange 35 is herein provided through its surrounding and transversely slidable or shiftable relationship along jack-shaft enlarged shouldered portion 104A. It can be seen in FIG. 3 that the opposite frustro-conical faces 36 and 39 for the respective flanges 35 and 38 are non-parallel and diverge away from the pulley axis 31 to accommodate V-belt 15 therebetween. The cross-sectional angle (FIG. 3) provided by faces 36 and 38 is constant (such as about 26°), similarly to the angle of faces 26 and 28, and irrespective of the transverse distance between the two flanges.

The transverse distance between the two driven-pulley flanges is dependent upon the torque of the vehicle's underlying traction means, which, of course, is herein sensed at jack-shaft 104. It is therefore important that there be means to automatically permit the movable flange of the driven-pulley to move away from its stationary flange, it being appropriate for higher engine-shaft "rpm" to also increase the driven-pulley "rpm." For this reason, driven-pulleys are usually generally classified as "normally-open torque-responsive," and springs on other yieldable brasing means are employed to automatically reduce the transverse distance between the two pulley flanges. For example, as best seen in FIG. 3, there is a helical spring 32 surrounding jack-shaft 104, one end of spring 32 bearing against the external side 37 of movable flange 35. A centrally open circular washer 33 surrounds jack-shaft 104 and bears leftwardly against the other end of spring 32, the rightward limit of travel for washer 33 being determined by nut 34 threadedly engaged withe and having a fixed location on jack-shaft 104.

Operation of the typical conventional tri-partite variable-ratio belt-drive transmission ("TVRBD") 10 might be summarized as follows. Phantom lines in FIGS. 1-3 indicate the vehicle engine 106 as "idling" with low "rpm" speed for engine-shaft 107, no appreciable centrifugal force therefore being exhibited upon sectoral weights 24 and they are relatively radially nearby pulley axis 21. Accordingly, movable flange 25 is free to move transversely leftwardly and relatively near the transversely immobile drum 22, and the pitch diameter for annular V-belt 15 is relatively small, i.e., positioned relatively radially near to pulley axis 21. However, when the "rpm" speed for engine-shaft 107 is made to increase, as when the vehicle operator manipulates engine throttle 109, increasing centrifugal force is exhibited upon sectoral weights 24. As indicated in solid line in FIGS. 1-3, this increasing centrifugal force causes weights 24 to move radially away from pulley axis 21 and circular garter spring 19 is forced to increase in diameter. The radially moving weights 24 also bear against the contours 23 and 27 of the drum 22 and flange 25, respectively, whereby flange 25 is forced to move transversely rightwardly toward stationary flange 28 whereupon the closer flange faces 26 and 29 force V-belt 15 to a pitch diameter relatively radially remote from pulley axis 21. Inasmuch as V-belt 15 is of constant annular size and the spacing between pulley axes 21 and 31 is fixed, the V-belt increased pitch diameter on driver-pulley 20 causes movable pulley 35 to move transversely rightwardly against biasing means 32 and the V-belt pitch diameter on driven-pulley 30 correspondingly decreases. A comparison of the phantom and solid line positions for V-belt 15 in FIGS. 2 and 3 readily reveals that lower "rpm" speeds for engine-shaft 107 (phantom line) results in a "low" gear condition wherein the driven-pulley 30, the jack-shaft 104, and tire 102 all rotate at an "rpm" even lower than that for the engine-shaft 107. However, at higher "rpm" speeds for engine-shaft 107 (solid lines), as initiated by throttle 109, results in "high" gear condition wherein the driven-pulley 30 and the jack-shaft 104 rotate at an "rpm" greater than that for engine-shaft 107, and even up to "overdrive" condition.

For such conventional tri-partite variable-ratio belt-drive transmission ("TVRBD"), illustrated as 10 in the immediately preceeding paragraphs, certain practical limitations therewith have long frustrated workers of the prior art. These frustrations stem from the basic premise (and adhered to herein) that "TVRBD" drives are appropriate mainly for self-propelled surface-vehicles that are heavily-loaded compared to the relatively low horsepower engine, e.g. variable speed gasoline engines for minibikes, snowmobiles, etc. In such "TVRBD" transmissions, it has long been appreciated that the "low/high" ratio, i.e., the ratio of "low" gear drive to "high" gear drive, is directly dependent upon the included angle between the opposing faces of the respective variable-width pulleys (e.g. 20 and 30). Generally, the smaller the included angle, the greater is the "low/high" ratio; however, as the included angle is reduced, also reduced is the maximum driving load which can be propelled by the limited horsepower engine. Faced with these parameters, prior art workers have concluded through experimentation (and adhered to herein) that an included angle of about 26° is "optimum," which means that "low/high" ratios of about 3.2/1 have become practically "standard." As seen in the typical "TVRBD" embodiment 10 of FIGS. 1-3, the opposing face angles at both the driver-pulley 20 and the driven-pulley 30 are substantially 26° whereby the "low" gear (phantom line) ratio is about 3.2:1 and the "high" gear (solid line) ratio is about 1:1 which is substantially the "standard" "low/high" ratio range of 3.2/1.

This "standard" "low/high" ratio range of substantially 3.2/1 has frustrated prior art workers because there is thereby imposed a load carrying limit upon low horsepower vehicles utilizing "TVRBD") transmissions. There are certain situations, such as snowmobiles, golf carts, etc., where it would be desirable to carry unusually heavy loads and without sacrificing "high" gear speeds, this requiring an amplified "low/high" ratio range not attainable with "TVRBD." However, as will next be described, the inventive concept herein does make it possible to readily adapt "TVRBD" transmissions of the prior art into a form where the "low/high" ratio range is amplified to at least 7/1 or even 9/1 whereby unusually heavy loads can be carried without increasing engine horsepower nor without sacrificing "high" gear vehicle speeds.

Figure 4:
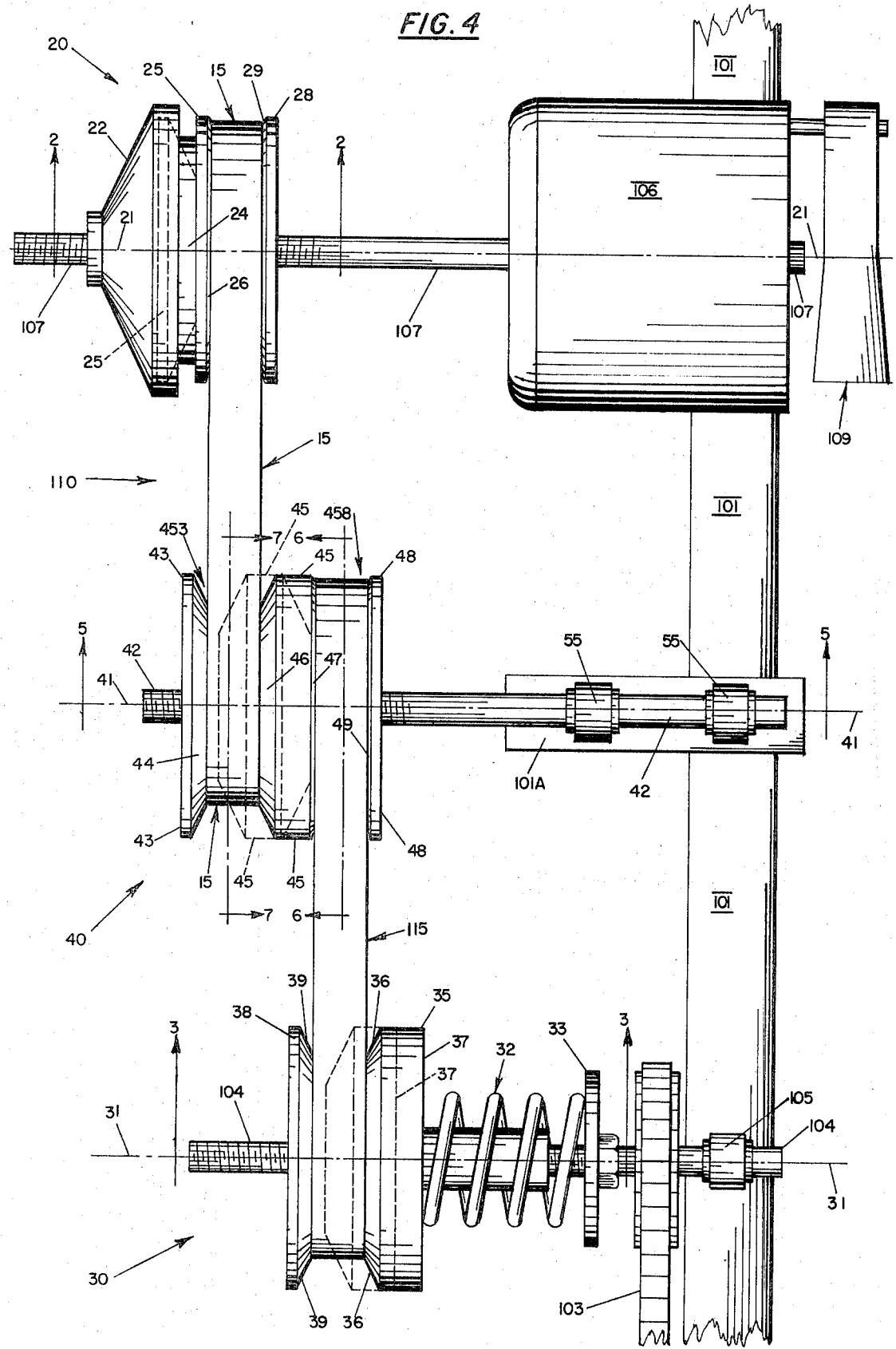
FIG. 4 is a schematic plan view of environment similar to FIG. 1, except embodying a representative form of the amplified low/high ratio "ARVRBD" concept of the present invention.

As exemplified in FIG. 4, the typical embodiment 110 for the variable-ratio belt-drive transmission of amplified low/high ratio range of the present invention (sometimes generally referred to as "ARVRBD") is based upon and retains therein the three basic components of "TVRBD" transmissions, namely the driver-pulley 20, the V-belt 15, and the driven-pulley 30. The primary structural advancements for the "ARVRBD" comprise the interpositional introduction of an additional V-belt (e.g. 115) and a uni-axial twinned-pulley (e.g. 40) having interdependent pitches for the two V-belts (e.g. 15 and 115). The uni-axial twinned-pulley 40 is appropriately affirmatively attached to the vehicle framework (e.g. 101) so that its transversely extending uni-axis (e.g. 41) is substantially parallel to the transversely extending axis (e.g. 21, 31) of the two variable-width pulleys; moreover, the three inter-axial spacings selected remains constant.

For uni-axial twinned-pulley having two beltways of interdependent pitches, there are basically three flanges each surrounding a pulley-shaft that transversely linearly extends along the uni-axis; the transverse distance between the first-flange and the third-flange is substantially fixed and constant. The two faces of the bi-directionally transversely movable second-flange provide, with the two respective faces of the first-flange and the third-flange, a first-beltway for a first-V-belt and a second-beltway for a second-V-belt. Inasmuch as the medial second-flange provides a portion of both beltways, said second-flange being bi-directionally transversely shiftably movable, then the pitch diameters for the first-V-belt and the second-V-belt are interdependent. Turning to FIGS. 5–7 which disclose a typical embodiment 40 of such twinned-pulley and that has a transversely linearly extending pulley-shaft 42 as the uni-axis 41 thereof. Uni-axis 41 and axes 21 and 31 remain in co-parallelism, and in this vein pulley-shaft 42 is revolvably secured to bearings 55 which are mounted onto a rigidly transversely extending plate portion 101A for vehicle frame 101. Plate 101A and bearings 55 are arbitrarily positioned in the embodiment 40 so that axes 31 and 21 are equidistant from uni-axis 41.

Twinned-pulley embodiment 40 comprises three flanges each surrounding uni-axis 41 and pulley-shaft 42 and including: first-flange 43, medial second-flange 45, and third-flange 48. First-flange 43 and third-flange 48 are transversely immobile along uni-axis 41 and herein provided through their threaded engagement with pulley-shaft 42 and tightly against opposite ends of the pulley-shaft enlarged shouldered portion 42A. Medially positioned second-flange 45 having two frustroconical faces 46 and 47 is bi-directionally transversely movable by virtue of its slidably shiftable relationship with pulley-shaft enlarged portion 42A. The two opposing faces 44 and 46 of first-flange 43 and second-flange 45 are non-parallel and herein converge toward pulley-shaft 42 to provide a gorge first-beltway 453, herein for first-V-belt 15. Similarly, opposing faces 49 and 47 of third-flange 48 and second-flange 45 are non-parallel and converge toward pulley-shaft 42 to provide a gorge second-beltway 458, herein for accommodating second-V-belt 115. The pitch diameter for first-V-belt 15 within first-beltway 453 depends upon the transverse distance between first-flange 43 and second-flange 45, while the pitch diameter for seond-V-belt 115 within second-beltway 458 depends upon the transverse distance between third-flange 48 and said second-flange 45. Thus, inasmuch as the pitch diameters for the respective V-belts 15 and 115 at respective beltways 453 and 458 are determined by the transverse location of the same second-flange 45, the twinned-pulley 40 has two beltways of interdependent pitches. It is readily apparent from FIGS. 4 and 5 that as the pitch diameter for first-V-belt 15 increases, the pitch diameter for second-V-belt 115 decreases, and vice versa, it being assumed that each V-belt is of substantially constant annular size and parallel axes 21, 31, and 41 are of fixed spacing. It is also readily apparent from FIGS. 4–7 that as the pitch diameter for first-V-belt 15 increases on driver-pulley 20 (as for increasing "rpm" for engine-shaft 107), its pitch diameter in first-beltway 453 decreases. Similarly apparent is that as the pitch diameter for second-V-belt 115 increases within second-beltway 458, it forces movable flange 35 away from stationary flange 38 and its pitch diameter at driven-pulley 30 decreases, and vice versa.

A comparison of FIGS. 1 and 4, and especially the analysis of V-belt pitch diameter changes upon bi-directional transverse shifting of movable flanges 25, 35, and 45, reveals a profound amplification of the overall low/high ratio range exists for FIG. 4. As had been previously mentioned in conjunction with embodiment 10 of FIG. 1, the overall low/high ratio range for prior art "TVRBD" with "optimum" face angles (26, 29 and 36, 39) is about 3.2/1. However, with the "ARVRBD" concept of the present invention, and maintaining "optimum" face angles at the driver-pulley and at the driven-pulley, the overall low/high ratio range is at least 7/1, and perhaps even 9/1. For example, in embodiment 110 for the "ARVRBD," it might be assumed that V-belts 15 and 115 are of equal annular and cross-sectional size, axis 41 being selected as equidistant from axes 21 and 31. It might also be assumed that the four respective facial angles (26,29; 36,39; 44,46; and 47,49) are equal and selected at about 26°. Thus, assuming that the V-belts solid line conditions in FIGS. 2, 3, and 5, have been attiained to yield "high rpm" for jack-shaft 104, and having commenced from engine-shaft "low rpm" at the V-belts phantom line positions, it is apparent that the "low gear" ratio (phantom line) is about 9:1 and the high gear" ratio (solid line) is about 1:1. This means an overall low/high ratio of substantially 9/1, a ratio heretofore considered unattainable for variable-ratio belt-drive transmissions based upon variable-width driver-pulleys and driven-pulleys. This desireably amplified low/high ratio range means that self-propelled surface vehicles might carry unusually heavy loads with relatively low-horsepower engines (even as low as five to 10 horsepower) and without sacrificing the vehicle's maximum speed capability at "high" gear.

From the foregoing, the construction and operation of the belt-drive transmission "ARVRBD" will be readily understood and further explanation is believed to be unnecessary. However, since numerous modifications and changes will readily occur to those skilled in the art, it is not desired to limit the invention to the exact construction shown and described. For example, the "ARVRBD" concept is adaptable for various cross-sections and dimensional sizes for the respective V-belts, selectable face angles (both symmetrical and assymetrical) for the twinned-pulley and other variable-width pulleys, various arrangements and aggregations of the components, etc. Accordingly, all suitable modifications and equivalents may be resorted to, falling within the scope of the appended claims.

I claim:

1. In a self-propelled surface vehicle having a variable speed engine including a throttle means therefor as the sole operator-controllable means for selectively controllably varying the engine-shaft "rpm" angular velocity and said vehicle also having underlying movable traction means, the improvement of a variable-ratio belt-drive transmission apparatus for said self-propelled surface vehicle and being capable of furnishing an unusually amplified low/high ratio range from the vehicle's said independently variable speed engine-shaft to its underlying traction means and comprising:

A. A variable-width driver-pulley adapted for co-revolvable installation with the variable speed engine-shaft, said driver-pulley including a pair of relatively transversely movable pulley flanges having non-parallel opposing faces which converge toward the driver-pulley transversely extending central axis, and means for automatically decreasing the flanges' transverse separation in response to increasing angular velocity for the engine-shaft, B. An annular first-V-belt engaged both with the driver-pulley and the first-beltway of a uni-axial twinned-pulley;

C. Said uni-axial twinned-pulley having a transversely linearly extending pulley-shaft as the uni-axis thereof and spaced a substantially fixed constant distance from and parallel to the driver-pulley central axis, said twinned-pulley comprising a first-flange and a third-flange in surrounding and substantially axially stationary relationship along the pulley-shaft, a dual-faces second-flange positioned between the first-flange and the third-flange and in surrounding and transversely movable relationship along the pulley-shaft, opposing faces of the first-flange and the second-flange being non-parallel and converging toward the pulley-shaft to provide a first-beltway gorge therebetween to accommodate the said first-V-belt, the transverse position of the dual-faces second-flange being wholly dependent upon the selected angular velocity for the engine-shaft, and opposing faces of the second-flange and the third-flange being non-parallel and converging toward the pulley-shaft to provide a second-beltway gorge therebetween;

D. A variable-width driven-pulley adapted for co-revolvable installation with a jack-shaft which is actuatably connected with the vehicle traction means, said driven-pulley including a pair of relatively transversely movable pulley flanges having non-parallel opposing faces which converge toward the driven-pulley transversely extending central axis and said axis being spaced a substantially fixed distance from and parallel to the twinned-pulley uni-axis, and transversely yieldable biasing means normally tending to minimize the transverse distance between the two driven-pulley flanges; and E. An annular second-V-belt engaged both with the driven-pulley and the second-beltway gorge of said twinned-pulley whereby as the second-V-belt pitch diameter on the interdependent pitches slave twinned-pulley increases it causes the movable flange of the driven-pulley to move against the yieldable biasing means and the second-V-belt diameter decreases thereat.

2. The variable-ratio belt-drive apparatus of claim 1 wherein the opposing faces of the driver-pulley flanges and the driven-pulley flanges are of frustro-conical shape, each set of opposing faces cross-sectionally providing substantially the same angle and within the range of about 24° to 30°; wherein the two faces of the twinned-pulley medial second-flange are of frustro-conical shape; and wherein each of the V-belts is of symmetrical cross-sectional shape and substantially cross-sectionally trapezoidal.

3. The variable-ratio belt-drive apparatus of claim 2 wherein the opposing flange faces providing the twinned-pulley first-beltway and the second-beltway are of frusto-conical shape, each set of opposing faces cross-sectionally providing substantially the same included angular value and within the range of about 24° to 30°.

4. The variable-ratio belt-drive apparatus of claim 3 wherein the first-V-belt and the second-V-belt are of substantially the same annular length whereby the twinned-pulley uni-axis is substantially equidistant from the transversely extending parallel central axes of the driver-pulley and of the driven-pulley; and wherein each of said inter-facial angles has substantially the value of 26°.

5. The self-propelled vehicle and variable-ratio belt-drive transmission apparatus combination of claim 1 wherein the variable-speed engine is a gasoline engine having a horsepower rating of less than about 10; and wherein the slave twinned-pulley has its pulley-shaft portion revolvably attached to the vehicle frame and permanently established a constant fixed distance from and substantially parallel to the revolvable engine-shaft and wholly remotely divorced from the throttle means for said gasoline engine.

* * * * *